(12) United States Patent  
Konno et al.

(10) Patent No.: US 8,193,921 B2  
(45) Date of Patent: Jun. 5, 2012

(54) MOTORCYCLE HANDLEBAR LOCK SYSTEM

(75) Inventors: Takeshi Konno, Wako (JP); Tadashi Onozuka, Wako (JP); Yoshiaki Takeuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 662 days.

(21) Appl. No.: 12/375,612

(22) PCT Filed: Dec. 25, 2007

(86) PCT No.: PCT/JP2007/075365  
§ 371 (c)(1),  
(2), (4) Date: Jan. 29, 2009

(87) PCT Pub. No.: WO2008/081965  
PCT Pub. Date: Jul. 10, 2008

(65) Prior Publication Data  
US 2010/0229611 A1    Sep. 16, 2010

(30) Foreign Application Priority Data  
Dec. 25, 2006   (JP) ................................. 2006-348450

(51) Int. Cl.  
*B60R 25/10*   (2006.01)

(52) U.S. Cl. ........... 340/426.17; 340/426.13; 340/426.1; 340/425.5

(58) Field of Classification Search .............. 340/426.17  
See application file for complete search history.

(56) References Cited

U.S. PATENT DOCUMENTS

| | | | |
|---|---|---|---|
| 6,407,663 B1 * | 6/2002 | Huggett | 340/461 |
| 6,759,828 B2 * | 7/2004 | Konno | 307/9.1 |
| 7,042,343 B2 * | 5/2006 | Konno et al. | 340/427 |
| 7,069,119 B2 * | 6/2006 | Ueda et al. | 701/2 |
| 7,477,136 B2 * | 1/2009 | Konno et al. | 340/426.28 |
| 2006/0049161 A1 * | 3/2006 | Richlen | 219/204 |
| 2006/0163947 A1 * | 7/2006 | Onishi et al. | 307/10.2 |
| 2006/0238295 A1 * | 10/2006 | Konno et al. | 340/5.61 |

FOREIGN PATENT DOCUMENTS  
JP    03-021575    1/1991

* cited by examiner

*Primary Examiner* — George Bugg  
*Assistant Examiner* — Kerri McNally  
(74) *Attorney, Agent, or Firm* — Rankin, Hill & Clark LLP (57) ABSTRACT

A motorcycle handlebar lock system (10) includes a control section (16) that executes a process of authenticating information necessary for driving a motorcycle (30), and a switch part (12L, 12R) for initiating the authentication process, the switch part being disposed within a grip (61 or 62) of a handlebar (31) of the motorcycle.

19 Claims, 11 Drawing Sheets

FIG.13

MOTORCYCLE HANDLEBAR LOCK SYSTEM

TECHNICAL FIELD

The present invention relates to an improvement in a handlebar lock system for a motorcycle.

BACKGROUND ART

A motorcycle handlebar locking apparatus, which is in the form of a card so as to be carried by a rider of a motorcycle and has a transmitter for transmitting a personal identification code to achieve the locking/unlocking of a handlebar of the motorcycle, a so-called "smart card key", is known from, for example, Japanese Patent Application Laying Open Publication No. 03-021575 (JP 03-021575 A).

Unlocking of the handlebar of the motorcycle disclosed in JP 03-021575 requires the execution of three steps as follows:
(1) to press an ON-switch disposed on an operation switch panel which in turn is mounted to a motorcycle body;
(2) to cause a control unit disposed on the motorcycle body and the transmitter carried by the motorcycle rider to communicate with each other so as to compare the personal identification code signal transmitted from the transmitter with a reference code or number; and
(3) to wait for the ON-switch to light up as a result of matching of the personal identification code with the reference code and to then press a handlebar unlocking switch on the operation switch panel to unlock the handlebar.

In the handlebar locking apparatus disclosed in JP 03-021575, steps (1) to (3) above need to be executed to unlock the handlebar. Particularly, steps (1) and (3) require an operation by the rider. It is desirable that those steps be reduced for the sake of convenience. Consequently, there is a demand for a more conveniently designed motorcycle handlebar lock system.

SUMMARY OF THE INVENTION

According to the present invention, there is provided a motorcycle handlebar lock system comprising: a portable key designed to be carried by a motorcycle rider; transmission and reception sections for transmitting to and receiving from the portable key information required for driving a motorcycle; a locking mechanism for locking and unlocking at a predetermined position a handlebar provided for steering the motorcycle; and a control section adapted to transmit information to the transmission section, to execute, on the basis of information received from the reception section, an authentication process required for driving the motorcycle and, when the authentication process successfully ended, to cause the locking mechanism to unlock the handlebar, wherein a switch part for initiating the authentication process by the control section is provided on a grip of the handlebar.

With this arrangement, gripping of the grip by the rider causes the control section to execute the authentication process. When the authentication is successfully completed, the handlebar is unlocked by the locking mechanism. In other words, by just gripping the grip, the handlebar is unlocked.

Preferably, the switch part comprises a proximity sensor disposed inside the grip.

In a preferred form, the grip is a throttle grip.

Desirably, the system further comprises a vehicle velocity sensor for detecting a traveling state of the motorcycle, and the control section is designed to keep the handlebar unlocked when the grip is gripped or when the motorcycle is detected as being in the traveling state.

It is desirable that the control section be designed to keep the handlebar locked when no detection is made by the switch part and when authentication of the information communicated between the control section and the portable key fails.

BRIEF DESCRIPTION OF THE DRAWINGS

A preferred embodiment of the present invention will be described in detail below, by way of example only, with reference to the accompanying drawings, in which.

BEST MODE FOR CARRYING OUT THE INVENTION

Figure 1:
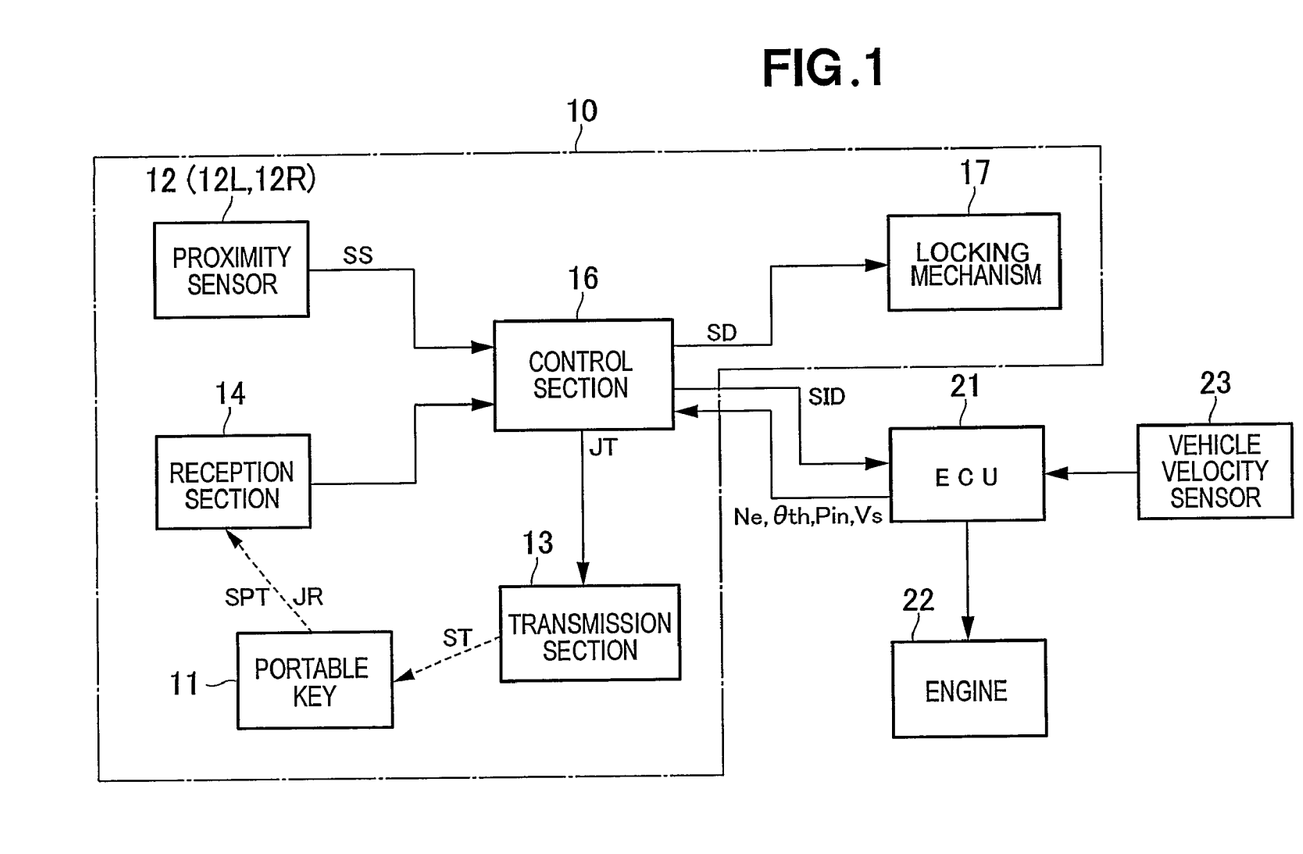
FIG. 1 is a block diagram illustrating a motorcycle handlebar lock system according to the present invention.

Reference is made initially to the block diagram of FIG. 1, illustrating a handlebar lock system 10 employed in a motorcycle. The handlebar lock system 10 comprises a portable key 11 to be carried by a rider of the motorcycle, a proximity sensor 12 for detecting a hand of the motorcycle rider carrying the key 11 coming into a predetermined range therefrom, a transmission section 13 for transmitting a transmission signal ST to the key 11, a reception section 14 for receiving a key transmission signal SPT from the key 11, a control section 16 for transmitting, on the basis of a detection signal SS from the proximity sensor 12, necessary transmission information JT to the key 11 via the transmission section 13 and for receiving via the reception section 14 necessary reception information JR from the key 11, a locking mechanism 17 for locking at a predetermined position a steering handlebar or for unlocking the handlebar on the basis of a drive signal SD from the control section 16.

The control section 16 performs so-called smart communication with the portable key 11 and carries out process of verification or authentication to determine whether the key 11 is the one proper to the motorcycle. The control section 16 also transmits to an ECU (Engine Control Unit) 21 an identification signal SID for controlling the operations of ignition and fuel injection apparatuses (not shown) provided to an engine 22, and receives information corresponding to a number of engine rotation Ne, a throttle opening degree θth, intake air negative pressure Pin and a vehicle velocity Vs detected by a vehicle velocity sensor 23.

Figure 2:
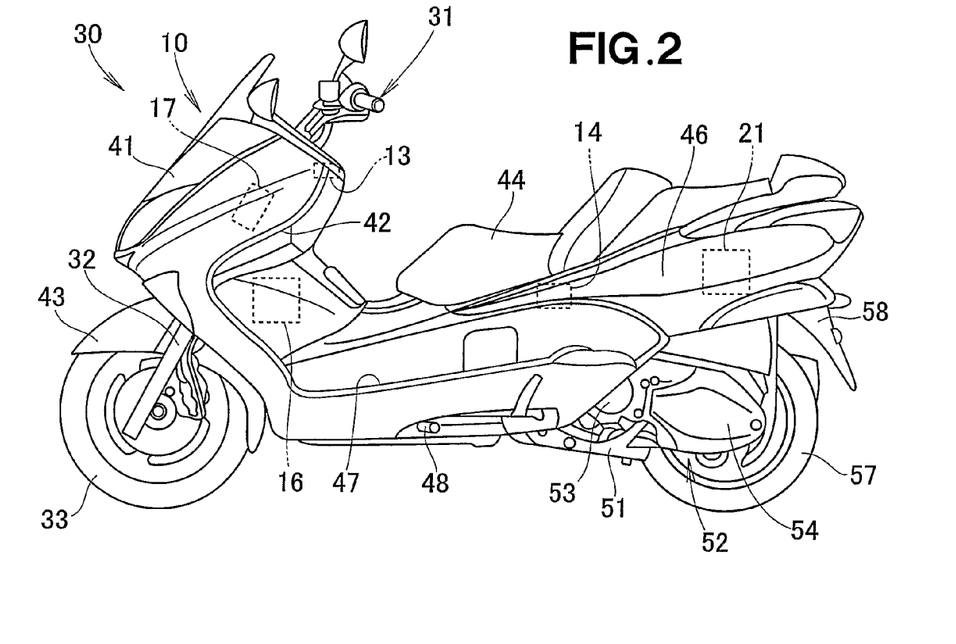
FIG. 2 is a side elevational view illustrating a motorcycle employing the handlebar lock system according to the present invention.

Turning now to FIG. 2, the motorcycle 30 includes a steering mechanism having a handlebar 31 and a front fork 32 through which to steer a front wheel 33. The steering mechanism is additionally provided with the handlebar lock system 10 for security purposes.

Designated by reference numeral 41 is a front cover. Reference numeral 42 denotes a leg shield; 43 a front fender; 44 a tandem seat; 46 a side cover; 47 a floor step; 48 a side stand; 51 a main stand; 52 a power unit; 53, 54 an engine and a continuously variable transmission (CVT) jointly forming the power unit 52; 57 a rear wheel; and 58 a rear fender.

The proximity sensor 12, transmission section 13, reception section 14, control section 16 and locking mechanism 17 that form the handlebar lock system 10 are disposed on various parts of the motorcycle body. The transmission section 13, control section 16 and the locking mechanism 17 are provided in the vicinity of the leg shield 42. The reception section 14 is provided downwardly of a front part of the tandem seat 44. The positioning of the proximity sensor 12 will be described later in relation to FIG. 3. The ECU 21 is provided inwardly of the side cover 46.

Figure 3:
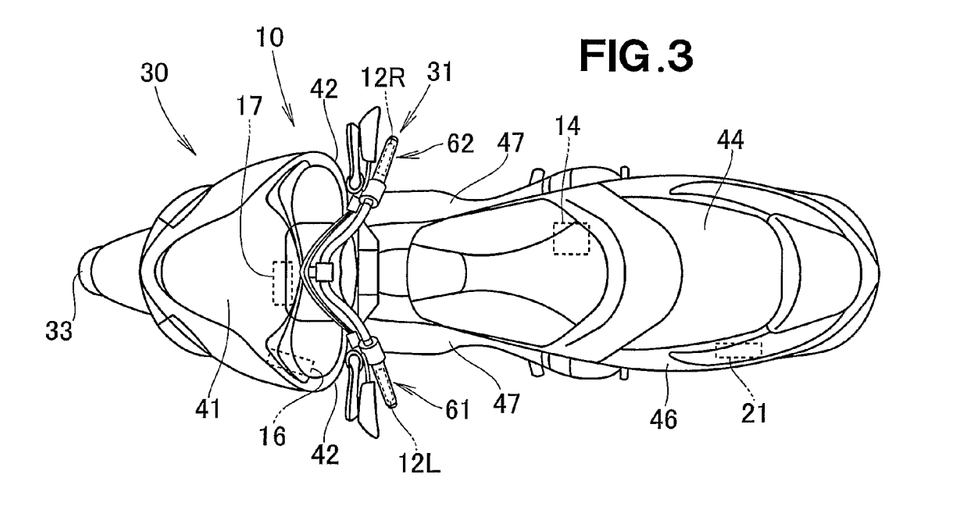
FIG. 3 is a top plan view illustrating the motorcycle employing the handlebar lock system according to the present invention.

Reference is now made to FIG. 3 showing in top plan the motorcycle employing the present invention. The steering handle 31 takes the form of a bar and hence is called a handlebar. The handlebar 31 includes at opposite ends left and right grips 61, 62 with the proximity sensor housed therein. Details of the proximity sensor arrangement will be described with reference to FIGS. 9A-9D and 10A-10B below. The right grip 62 serves as a throttle grip for opening/closing a throttle valve of an intake apparatus provided on the engine 22.

Figure 4:
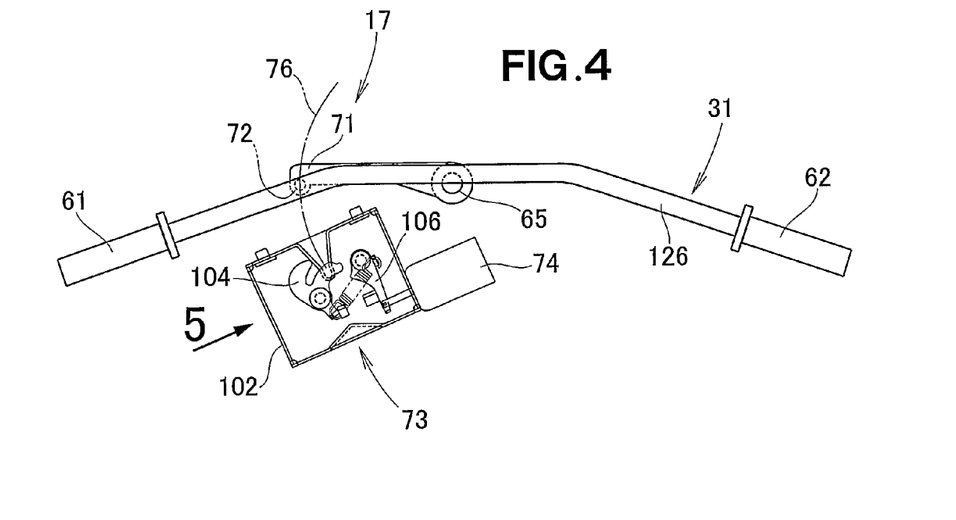
FIG. 4 is an enlarged view illustration a locking mechanism of the handlebar lock system according to the present invention.

As shown in FIG. 4, the locking mechanism 17 is comprised of a locking arm 71, a catch mechanism 73 and an actuator 71. The locking arm 71 has, at a top end thereof, a locking pin 72, and is attached to a steering shaft 65 that supports the handlebar 31 and is positioned downwardly of the handlebar 31 in such a manner as to extend longitudinally to the handlebar 31. The catch mechanism 73 is capable of locking engagement with the locking pin 72 of the locking arm 71 when the handlebar 31 is turned to a maximal left position. The actuator 74 is attached to the catch mechanism 73 and is designed to disengage the catch mechanism 73 from the locking pin 72. Reference numeral 76 designates a path of rotation of the locking pin 72.

Figure 5:
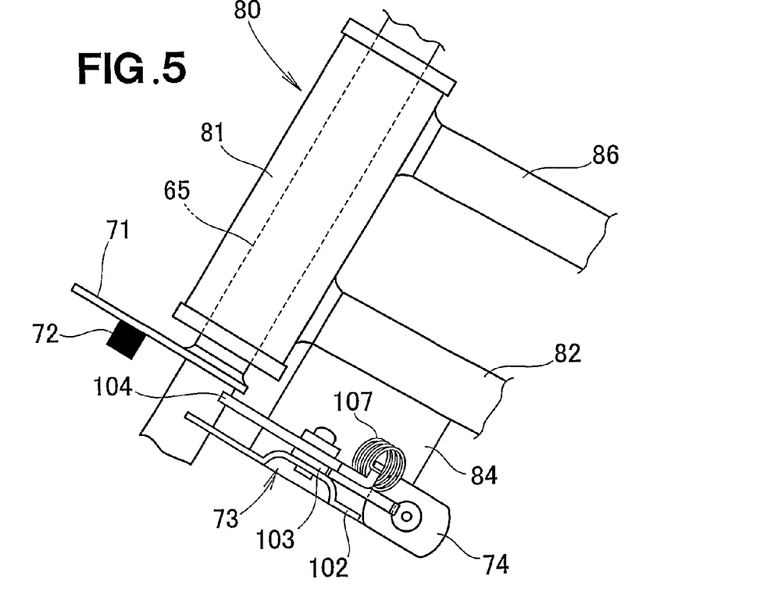
FIG. 5 is a side elevational view illustrating a state of attachment of the locking mechanism.

Turning now to FIG. 5, the motorcycle has a body frame 80 with a head pipe 81 forming a front part of the body frame 80, in which the steering shaft 65 is rotatably received. The locking arm 71 is attached to that part of the steering shaft 65 which is positioned downwardly of the head pipe 81. The catch mechanism 73 and the actuator 74 are attached via a bracket 84 to a lower part of a down tube 82 extending obliquely rearwardly downwardly.

Denoted by reference numeral 86 is a main frame extending from the head pipe 81 obliquely rearwardly downwardly. The main frame 86 and the down tube 82 are parts that constitute the body frame 80.

Figure 6A:
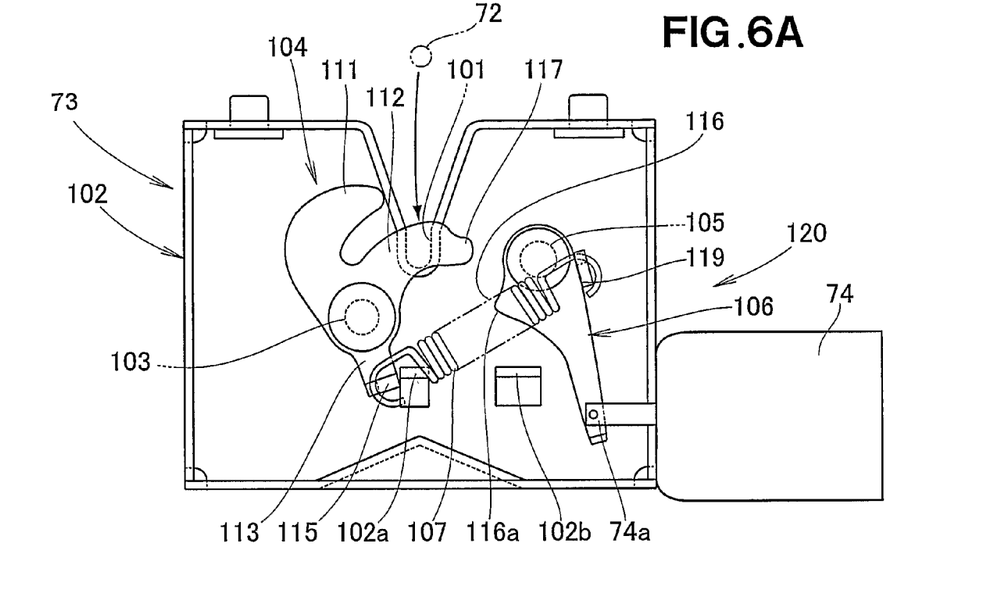
FIGS. 6A and 6B are front elevational views illustrating a catch mechanism of the handlebar lock system according to the present invention.

Next, discussion will be made as to the details of the catch mechanism 73 with reference to FIGS. 6A and 6B. As shown in FIG. 6A, the catch mechanism 73 comprises a housing 102 with a U-shaped groove 101, a locking pawl 104 mounted swingably to the housing 102 via a pin 103, a stop member 106 swingably mounted to the housing 102 via a pin 105 for retaining the locking pawl 104 in a locking position, and a tension spring 107 anchored to the locking pawl 104 and the stop member 106 in such a manner as to pull the locking pawl 104 in a locking direction and to pull the stop member 106 in a clockwise direction. Reference numerals 102a and 102b designate rising parts rising from the housing 102 and provided for serving as restrictors that restrict the pivotal movement of the locking pawl 104 and the stop member 106.

The locking pawl 104 is comprised of an upper pawl part 111, a lower pawl part 112 continuing from the upper pawl part 111, and a lower arm part 113 that jointly form a generally F-shape. The lower arm part 113 has a spring stop part 115 to which one end of the tension spring 107 is anchored.

The stop member 106 has a peak part 116 with a slope part 116a, and a spring stop part 119 to which the other end of the tension spring 107 is attached. The slope part 116a provided to the peak part is adapted to abut against a lower projection 117 provided to the lower pawl part 112 of the locking pawl 104. The locking pawl 104 is rotated in a locking direction by pressing down the lower pawl part 112 of the locking pawl 104 with the locking pin 72 attached to the locking arm 71 (FIG. 4).

Figure 6B:
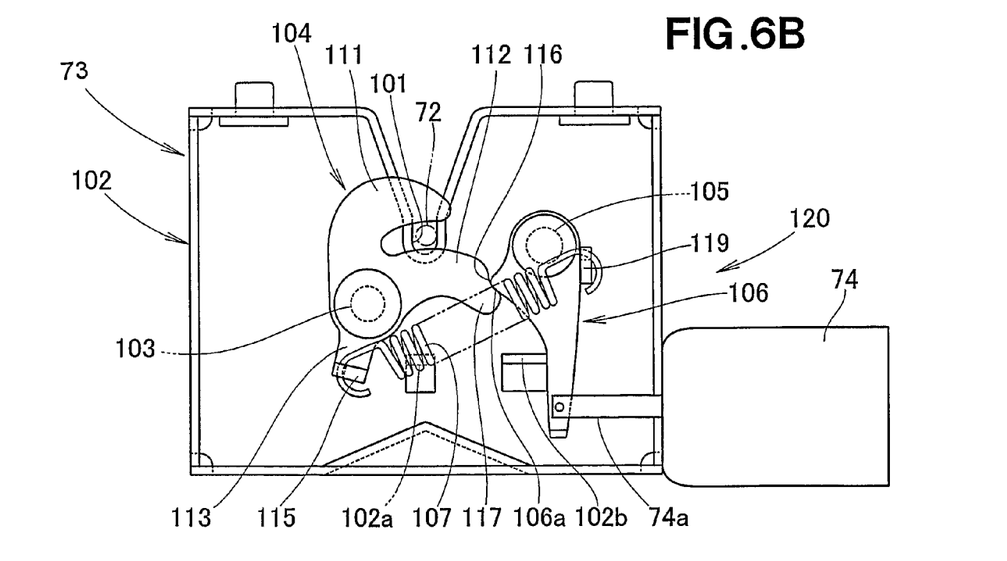

When the catch mechanism 73 and the locking pin 72 are engaged with each other, as shown in FIG. 6B, the slope part 116a of the stop member 106 abuts against the lower projection 117 of the locking pawl 104. The slope part 106a of the stop member 106 serves as a stopper for restricting the counter-clockwise rotation of the locking pawl 104. That is, in the handlebar locked state, the locking pawl 104 is thus in locking engagement with the locking pin 72.

In this state, by actuating the actuator 74 to cause a rod 74a to retract into the actuator 74, the stop member 106 is rotated to thereby unlock the handlebar 31. The actuator 74 and the stop member 106 together form an unlocking mechanism 120.

Figure 7A:
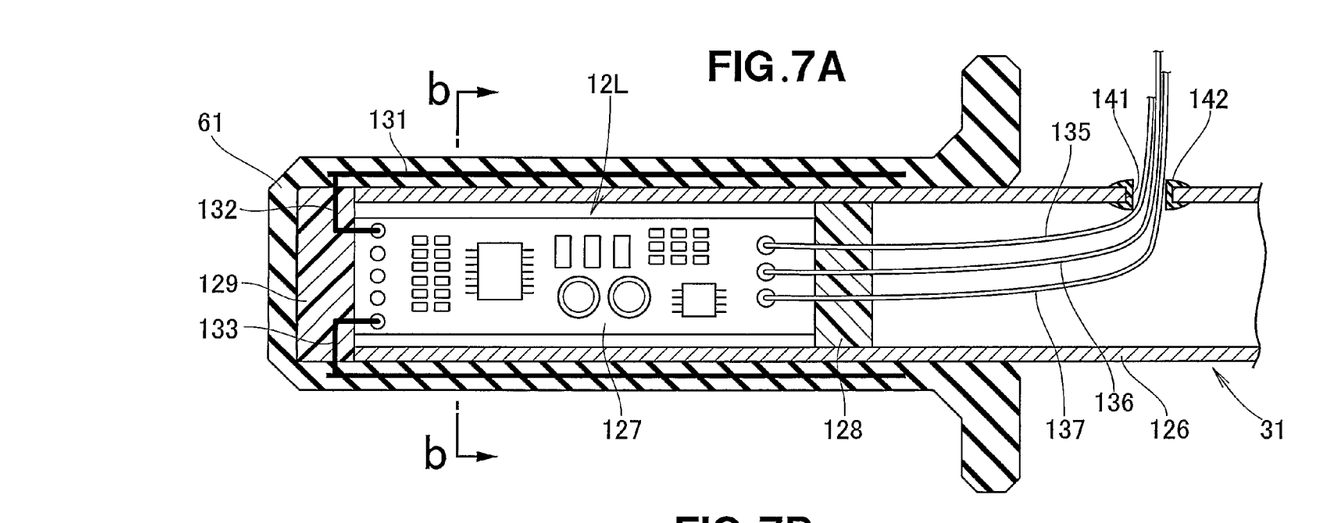
FIGS. 7A and 7B are cross-sectional view illustrating a left grip of the handlebar.
Figure 7B:
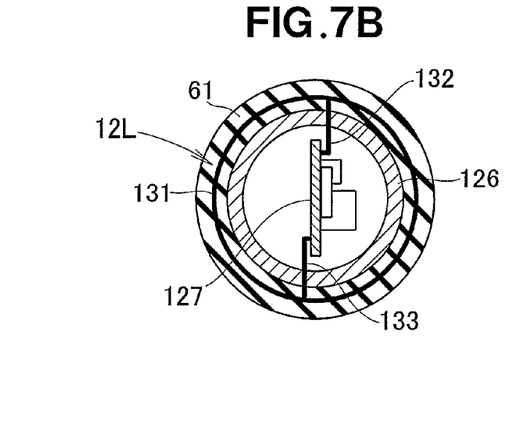

As shown in FIG. 7A, the left grip 61 is made of rubber and accommodates a left proximity sensor 12L. The left proximity sensor 12L is a capacitance sensor which is comprised of a sensor board 127, support members 128, 129, an electrode 131, and two conductive wires 132, 133. The sensor board 127 is fitted into an end part of a pipe member 126 that forms the handlebar 31. For supporting opposite ends of the sensor board 127, one of the support members 128, 129 is disposed within the pipe member 126 while the other one of the support members 128, 129 is disposed between the pipe member 126 and the left grip 61. The electrode 131 is embedded in the left grip 61. The conductive wires 132, 133 electrically connect the electrode 131 with the sensor board 127.

The sensor board 127 is electrically connected with the control section 16 via three conductive wires 135-137. Reference numeral 141 designates a through-hole formed in the pipe member 126 for letting the three conductive wires 135-137 out of the pipe member 126. 142 denotes a rubber grommet fitted in the through-hole 141.

Figure 8A:
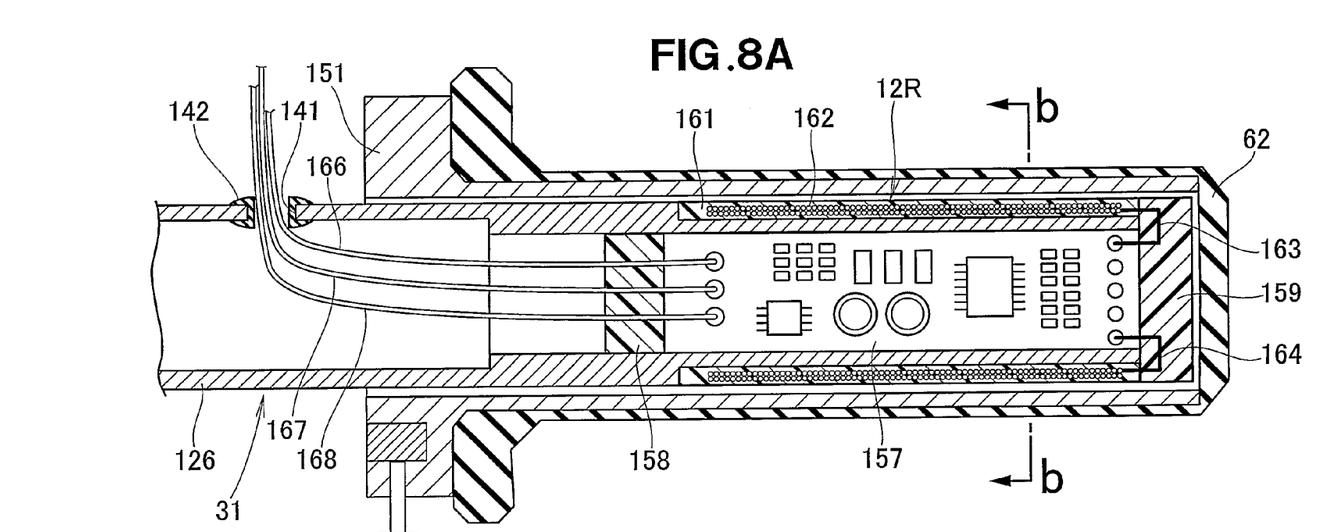
FIGS. 8A and 8B are cross-sectional views illustrating a right grip of the handlebar.

The right grip 62 is made of rubber and accommodates a right proximity sensor 12R, as shown in FIG. 8A. The right grip 62 is fitted within a tubular grip support member 151 rotatably mounted to the pipe member 126. Reference numeral 152 designates a throttle cable 152 connected at one end to a throttle valve, not shown, and at an opposite end to the grip support member 151.

The right proximity sensor 12R is an inductance sensor and comprised of a sensor board 157, support members 158, 159, a coil 162, and two conductive wires 163, 164. The sensor board 157 is housed in an end part of the pipe member 126. For supporting opposite ends of the sensor board 157, of the supporting members 158, 159, one is disposed within the pipe member 126 while the other is disposed between the pipe member 126 and the right grip 62. The coil 162 is embedded in a resinous tubular member 161 which is fitted in the end of the pipe member 126. The sensor board 157 is electrically connected with the control section 16 via three conductive wires 166-168.

Figure 8B:
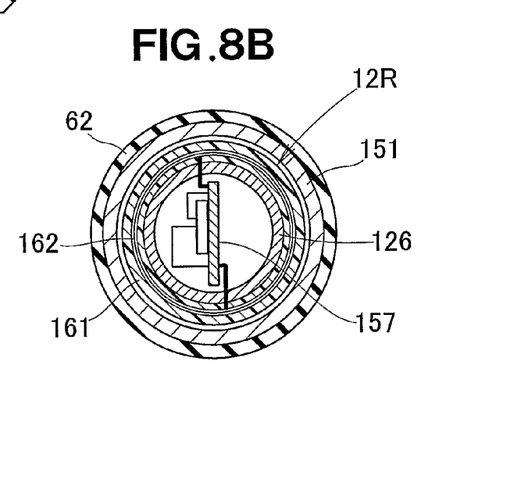

As shown in FIG. 8B, the coil 162 is disposed concentrically with the pipe member 126 and the right grip 62. When the right grip 62 is gripped with a hand of the rider, inductance in the energized coil 162 changes compared to when the grip is not gripped. This change in inductance is fed as a detection signal to the control section 16.

An operation of the described locking mechanism 17 will now be described with reference to FIGS. 9A to 9D.

Figure 9A:
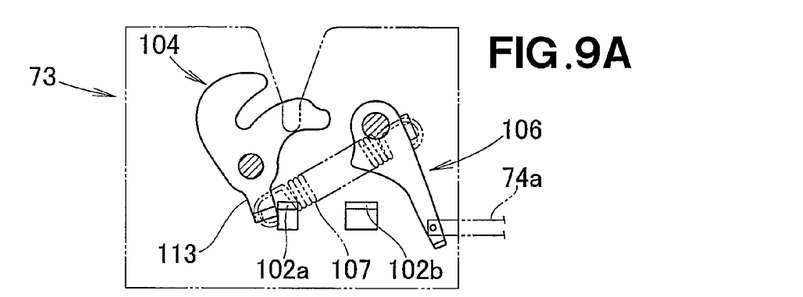
FIGS. 9A to 9D are enlarged views illustrating an operation of the locking mechanism.

In FIG. 9A, when the rider carrying the portable key makes access to the motorcycle being stopped and grips one of the grips before the handlebar lock system is placed in the handlebar locking state, the lower arm part 113 of the locking pawl 104 of the catch mechanism 73 stays at a position where it abuts against the rising part 102a. At this time, the stop member 106 is pulled by the actuator 74 and stays at a position where it does not interfere with the locking pawl 104 even when the latter is turned clockwise. This is the handlebar unlocked state.

Figure 9B:
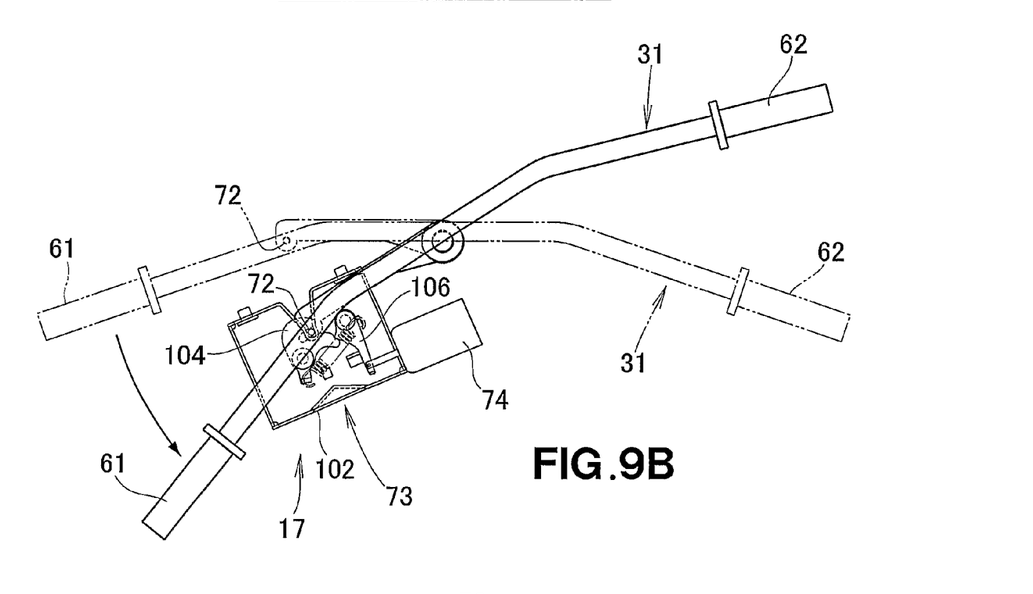

In this state, by turning the handlebar 31 maximally to the left, as shown in FIG. 9B, the locking pin 72 of the locking mechanism 17 is brought to a position where it presses down the locking pawl 104 of the catch mechanism 73.

Figure 9C:
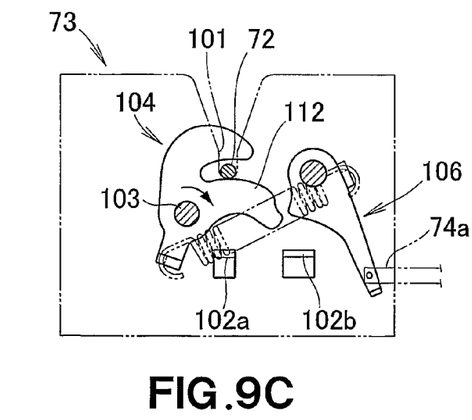

In FIG. 9C, the lower pawl part 112 of the locking pawl 104 is pressed down by the locking pin 72 to cause the locking pawl 104 to rotate in an arrowed direction until the locking pin 72 comes into abutment with the bottom of the U-shaped groove 101 of the housing 102. Stated otherwise, turning the handlebar 31 maximally to the left causes the locking pin 72 to come into abutment with the bottom of the U-shaped groove 101.

The stop member 106 stays at the position of FIG. 9A away from the locking pawl 104 so that the locking pin 72 and the catch mechanism 73 are not yet engaged with each other. This is the state in which the handlebar locking is possible, that is, a handlebar locking ready state.

Figure 9D:
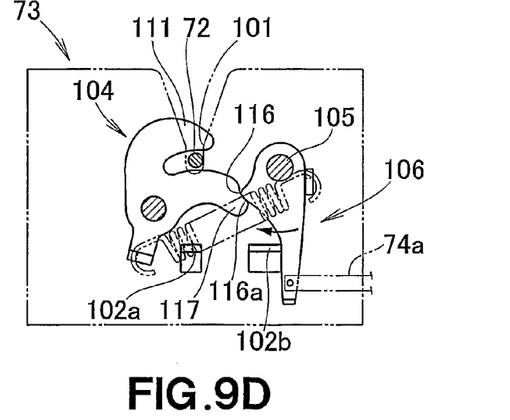

In this state, when the rider with the portable key walks a predetermined distance away from the motorcycle, communication between the key and the locking mechanism fails to make the key authentication void, whereby, as shown in FIG. 9D, the actuator is actuated to cause the stop member 106 to turn about the pin 105 in an arrowed direction until the stop member 106 abuts against the rising part 102b and stops thereat. At this time, the slope part 116a of the peak part 116 of the stop member 106 comes into a position to confront the lower projection 117 of the locking pawl 104 so that the stop member 106 prevents rotation of the locking pawl 104. As a result, owing to the upper pawl part 111 of the locking pawl 104, the locking pin 72 is inhibited from coming out of the U-shaped groove 101. This is the handlebar locked state.

As the portable key authentication becomes void, the authentication in the authentication process performed between the control section and ECU also becomes void, whereby the ignition apparatus and the fuel injection apparatus of the engine 22 becomes inoperable.

Compared to the conventional handlebar locking system wherein the handlebar is turned to a predetermined position and then the main switch is turned to the locking position to establish the handlebar locking state, the handlebar locking system 10 according to the present invention requires fewer steps and is easy to operate.

Turning back to FIGS. 1 to 3, when the proximity sensor 12L or 12R detects at least one of the left and right grips 61, 62 being gripped by the driver carrying the portable key 11, the control section 16 is actuated to start (smart) communication between the control section 16 and the portable key 11. That is, a request signal as the transmission signal ST is transmitted from the control section 16 to the portable key 11 via the transmission section 13. When the portable key 11 receives the request signal, a personal identification code as the key transmission signal SPT is transmitted to the control section 16 via the reception section 14.

As the control section 16 receives the key transmission signal SPT, the personal identification code is compared with a reference number stored in the control section 16 (authentication process). When the personal identification code matches the reference number, the control section causes the locking mechanism 17 to unlock the handlebar 31.

The control section 16 also transmits a signal SID corresponding to a personal identification number to the engine control unit (ECU) 21, whereupon the ECU 21 transits to the control section 16 information such as the number of engine rotation Ne, the degree of throttle opening θth, intake negative pressure and the vehicle velocity detected by the vehicle velocity sensor 23. At the same time, the personal identification code signal is compared for verification with the reference signal during the operation of the ECU 21. When the personal identification code signal matches the reference signal, the ignition apparatus and the fuel injection apparatus of the engine are placed in an operable state.

Next, discussion will be made as to the handlebar unlocking operation of the locking mechanism 17 with reference to FIGS. 10A and 10B.

Figure 10A:
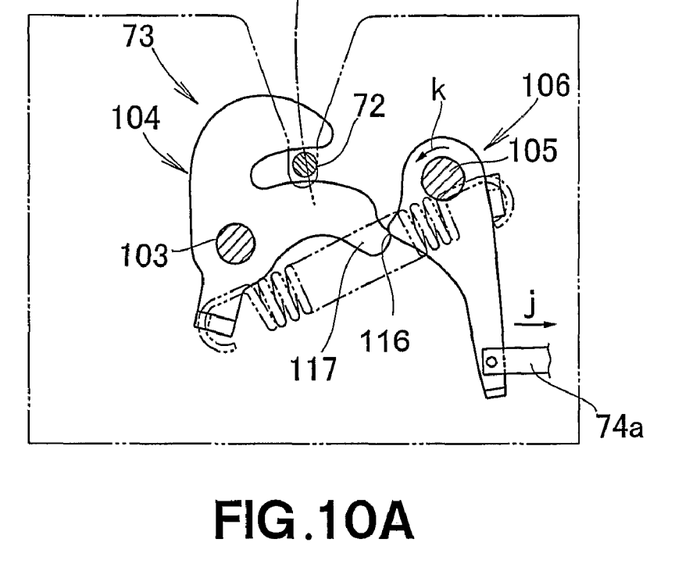
FIGS. 10A and 10B are partial enlarged views illustrating an operation of the locking mechanism.
Figure 10B:
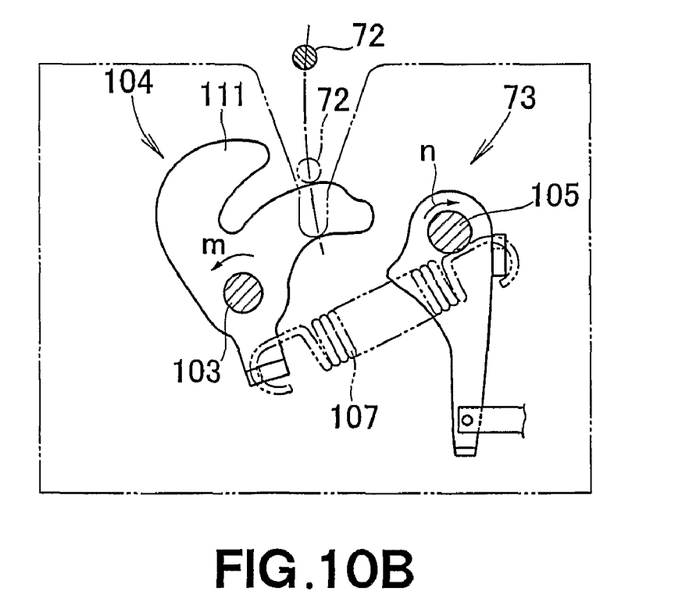

From the handlebar locked state shown in FIG. 9D, the locking pin 72 and the catch mechanism 73 are unlocked as shown in FIG. 10A. That is, to unlock the handlebar 31, the actuator is actuated to pull the rod 74a in a direction shown by arrow j to cause the stop member 106 to rotate as shown by arrow k. This makes the peak portion 116 of the stop member 106 descent and pass over the lower projection 117 of the locking pawl 104. As a result, as shown in FIG. 10B, the locking pawl 104 rotates by a tension force of the tension coil spring 107 in a direction shown by arrow m to thereby release the locking pin 72 from the upper pawl part 111 of the locking pawl 104. As a result, the locking pin 72 is released from the catch mechanism 73 to thereby establish the handlebar unlocked state.

As the main switch is turned off to cut off the supply of power to the control section and the operation of the control section is stopped, pulling of the rod 74a of the actuator is terminated and the stop member 106 turns, as shown by arrow n, to a position where it abuts against the rising part 102b.

Figure 11:
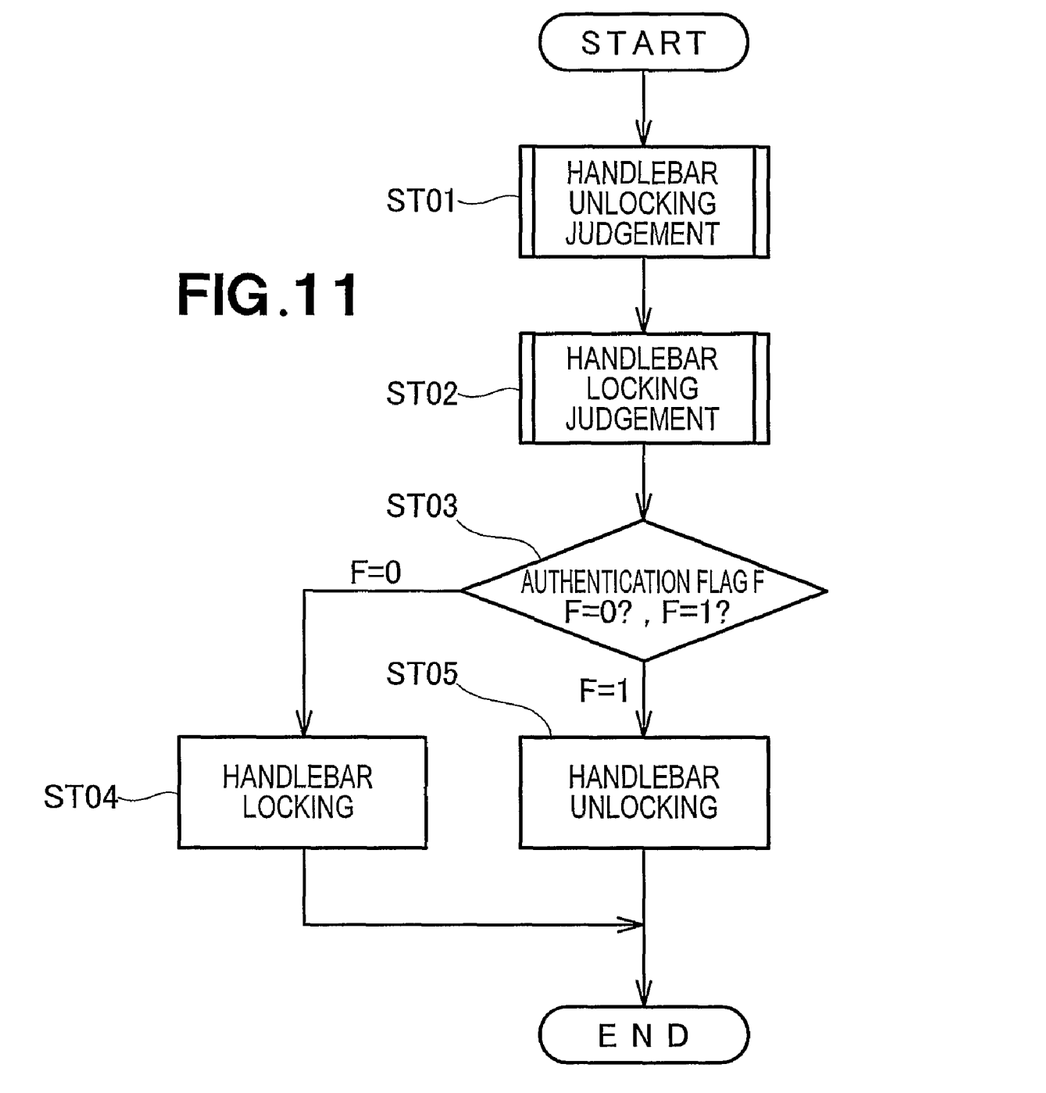
FIG. 11 is a flowchart of the handlebar locking/unlocking control according to the present invention.

Referring now to the flowchart of FIG. 11, discussion will be made as to the handlebar locking/unlocking control. Reference character ST in the Figure represents a step.

ST 01: A handlebar unlocking judgment is carried out. Details of this step will be described later with reference to FIG. 12.

ST 02: A handlebar locking judgment is performed. Details of this process will be described later with reference to FIG. 13.

ST 03: Judgment is made as to whether an authentication flag F is F=0 or F=1 When F=0, the process proceeds to ST 04. When F=1, the process proceeds to ST 05.

ST 04: The handlebar lock system is placed in a locking state.

ST 05: The handlebar lock system is placed in an unlocking state.

Figure 12:
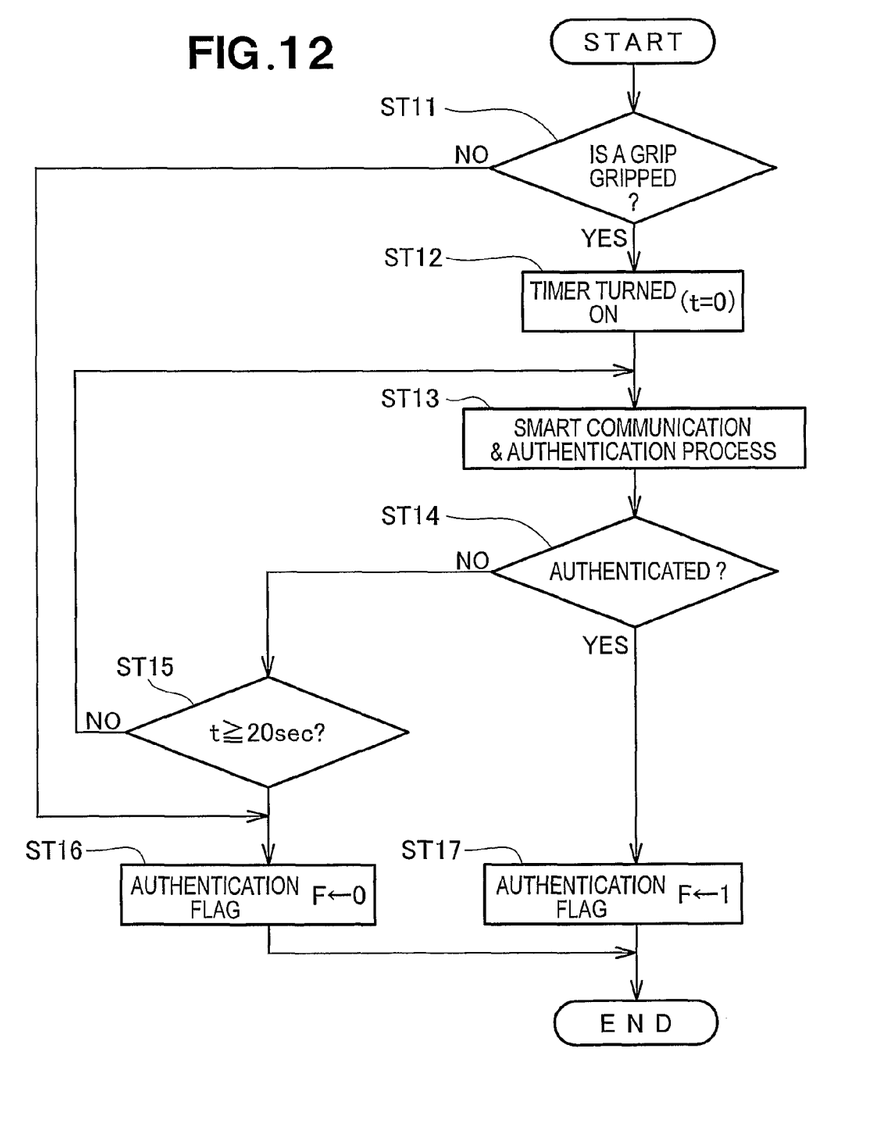
FIG. 12 is a flowchart of the handlebar unlocking judgment process according to the present invention.

Referring to the flowchart of FIG. 12, the handlebar unlocking judgment will be described now.

ST 11: Judgment is made as to whether a grip of the handlebar is gripped. When the grip is gripped (YES), the process proceeds to ST 12. When the grip is not gripped (NO), the process proceeds to ST 16.

ST 12: The timer is turned on. Elapsed time t is set to start from 0.

ST 13: For authentication, smart communication is made between the portable key and the control section.

ST 14: Judgment is made as to whether the personal identification code was authenticated. When the personal identification code authentication fails (NO), the process proceeds to ST 15. When the PIN was authenticated (YES), the process proceeds to ST 17.

ST 15: Judgment is made as to whether the elapsed time t is 20 sec. or over. When the elapsed time t is less than 20 seconds, that is, t<20 seconds (NO), the process proceeds to ST 13. When the elapsed time t is 20 seconds or over, that is, t≧20 seconds (YES), the process proceeds to ST 16.

ST 16: 0 is given for authentication flag F.

ST 17: 1 is given for authentication flag F.

Figure 13:
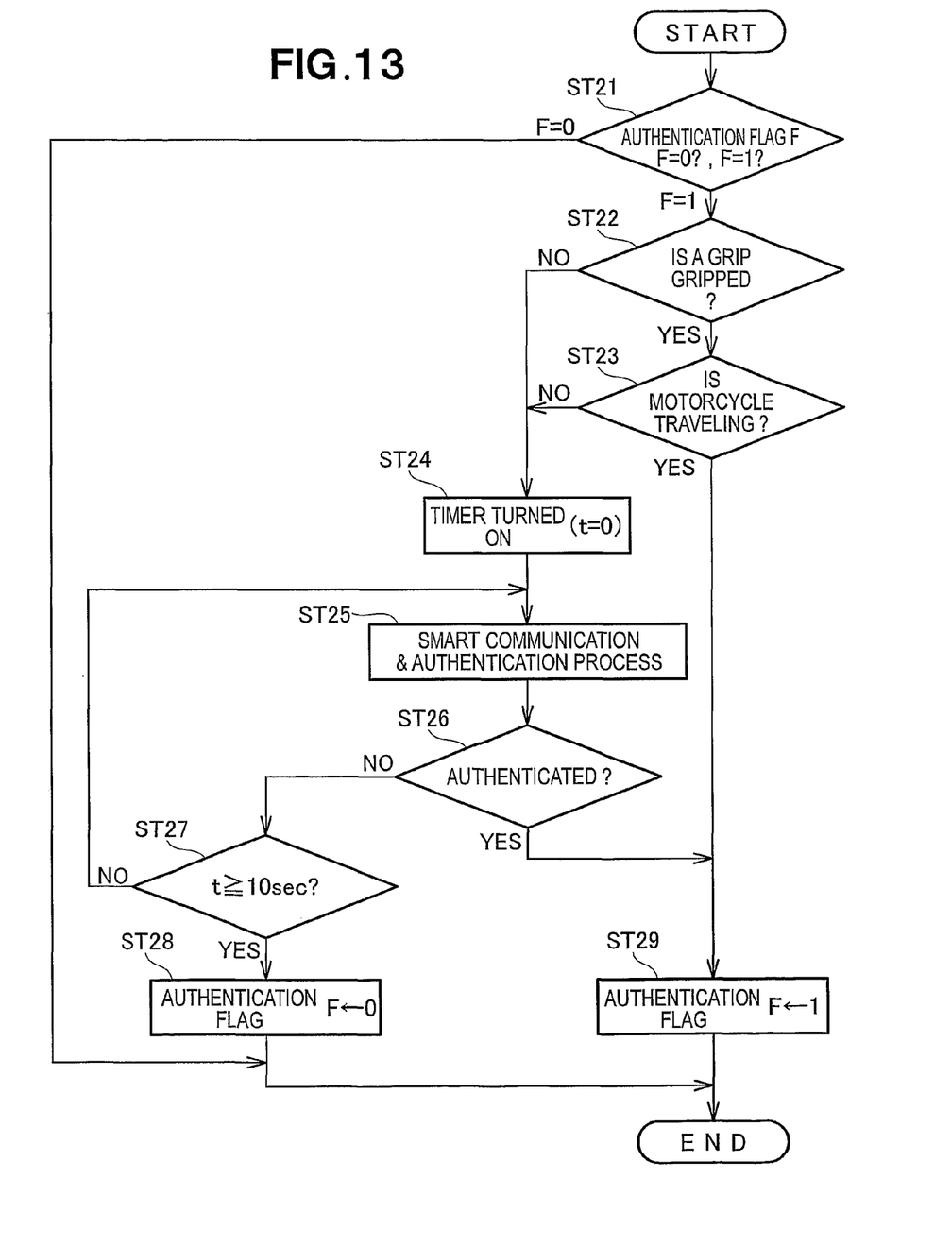
FIG. 13 is a flowchart of the handlebar locking judgment process according to the present invention.

Handlebar locking judgment will now be described with reference to the flowchart of FIG. 13.

ST 21: Judgment is made as to whether the authentication flag F is F=0 or F=1. When F=0, the process is finished. When F=1, the process proceeds to ST 22.

ST 22: Judgment is made as to whether the handlebar grip is gripped. When the grip is gripped (YES), the process proceeds to ST 23. When the grip is not gripped (NO), the process proceeds to ST 24.

ST 23: Judgment is made as to whether the motorcycle is traveling. When the motorcycle is not traveling (NO), the process proceeds to ST 24. When the motorcycle is traveling (YES), the process proceeds to ST 29.

ST 24: The timer is turned ON; the elapsed time t starts from 0 (zero).

ST 25: For achieving the authentication process, the portable key and the control section communicate with each other (smart communication).

ST 26: Judgment is made as to whether the personal identification code is authenticated. When the authentication failed (NO), the process proceeds to ST 27. When the key is authenticated (YES), the process proceeds to ST 29.

ST 27: Judgment is made as to whether the elapsed time t is 20 seconds or longer. When the elapsed time t is less than 10 seconds, that is, t<10 seconds (NO), the process proceeds to ST 25. When the elapsed time t is 10 seconds or longer, that is, t≧10 seconds (YES), the process proceeds to ST 28.

ST 28: The authentication flag F is given 0.

ST 29: The authentication flag F is given 1.

As can be readily appreciated from FIGS. 1 to 3 and the discussions made in relation thereto, the present invention is directed to a motorcycle handlebar lock system 10 which comprises: a portable key 11 designed to be carried by a motorcycle rider; transmission and reception sections 13, 14 for transmitting to and receiving from the portable key 11 information required for driving a motorcycle 30; a locking mechanism 17 for locking/unlocking at a predetermined position a handlebar 31 for steering the motorcycle 30; and a control section 16 adapted to transmit necessary information to the transmission section 13, to execute, on the basis of information received from the reception section 14, an authentication process which is required for driving the motorcycle 30 and, when the authentication process successfully ended, to cause the locking mechanism 17 to unlock the handlebar 31, wherein a switch part 12L or 12R for initiating the authentication process by the control section 16 is provided on a grip 61 or 62 of the handlebar 31.

By virtue of the left and right proximity sensors 12L, 12R being provided on the left and right grips 61, 62 that are surely gripped by a rider before the motorcycle is started, the handlebar unlocking action is simplified, thus saving trouble experienced before starting a motorcycle.

In an additional aspect of the present invention, as shown in FIGS. 7A to 8B, the switch part comprises a proximity sensor 12L or 12R which is disposed inside the grip 61 or 62, so that detection to initiate the authentication process can be effected without changing the external aesthetical appearance as ever.

In a further aspect of the present invention, as shown in FIGS. 1 to 3, the right grip 62 is a throttle grip. Since the throttle grip is surely gripped before starting the motorcycle 30, the handlebar 31 can surely be unlocked before starting the motorcycle.

In a still further aspect of the present invention, the handlebar lock system further includes a vehicle velocity sensor 23 for detecting the traveling state of the motorcycle 30, wherein the control section 16 keeps the handlebar 31 unlocked when at least one of the left and right grips 61, 62 is gripped or when the motorcycle 30 is traveling. With this arrangement, it becomes possible to prevent the handlebar 31 from being locked unexpectedly where steering is required.

In a still further aspect of the present invention, the handlebar 31 is kept in the locked state when no detection is made by the left and/or right proximity sensors 12L, 12R and when authentication of the information communicated between the control section 16 and the portable key 11 fails. As a result, it becomes possible to keep the handlebar 31 locked when the motorcycle rider carrying the key 11 leaves the motorcycle 30.

Although the invention has been described in relation to the embodiment wherein the handlebar is unlocked when at least one of the left and right grips 61, 62 is gripped, the invention should not be construed as being limited to that embodiment. The arrangement may be altered such that the handlebar 31 is unlocked when only one of the left and right grips 61, 62 is gripped.

In this instance, in FIGS. 9A to 9D, when both the left and right grips 61, 62 are gripped, the arrangement may be changed such that without pulling the stop member 106 by the actuator 74, the stop member 106 of the catch mechanism 73 is brought into abutment with the rising part 102b. When the handlebar 31 is turned maximally to the left in this arrangement, the handlebar 31 may be unlocked instead of it being locked.

Although the switch part was formed by the proximity sensors 12L, 12R, a touch sensor or similar sensors may be employed in their stead.

INDUSTRIAL APPLICABILITY

The handlebar lock system according to this invention is particularly useful for motorcycles.

The invention claimed is:
1. A motorcycle handlebar lock system comprising:
a portable key designed to be carried by a motorcycle rider;
transmission and reception sections for transmitting to and receiving from the portable key information required for driving a motorcycle;

a locking mechanism for locking and unlocking at a predetermined position a handlebar provided for steering the motorcycle;

a control section transmitting information to the transmission section, to execute, on the basis of information received from the reception section, an authentication process required for driving the motorcycle and, when the authentication process successfully ended, to cause the locking mechanism to unlock the handlebar; and a switch part that initiates the authentication process by the control section is provided on a grip of the handlebar, wherein the grip is a throttle grip.

2. The motorcycle handlebar lock system of claim 1, wherein the switch part comprises a proximity sensor which is disposed inside the grip.

3. The motorcycle handlebar lock system of claim 1, further comprising a vehicle velocity sensor for detecting a traveling state of the motorcycle, wherein the control section is designed to keep the handlebar unlocked when the grip is gripped or when the motorcycle is detected as being in the traveling state.

4. The motorcycle handlebar lock system of claim 1, wherein the control section is designed to keep the handlebar locked when no detection is made by the switch part and when authentication of the information communicated between the control section and the portable key fails.

5. The motorcycle handlebar lock system of claim 1, wherein the switch part is a capacitance sensor.

6. The motorcycle handlebar lock system of claim 5, the capacitance sensor including a sensor board fitted into an end part of the handlebar,
a first support member coaxially disposed within the handlebar and supporting a first end of the sensor board,
a second support member laterally disposed between the grip and the end part, the second support member supporting a second end of the sensor board,
an electrode embedded in the grip, and
first and second wires connecting the electrode to the sensor board.

7. The motorcycle handlebar lock system of claim 6, wherein the sensor board is electrically connected to the control section.

8. The motorcycle handlebar lock system of claim 1, wherein the grip coaxially surrounds a lateral end of the handlebar so as to provide a gripping surface for the rider.

9. The motorcycle handlebar lock system of claim 8, wherein the grip is rotatably connected to the handlebar.

10. A motorcycle handlebar lock system, comprising:
a portable key designed to be carried by a motorcycle rider;
transmission and reception sections for transmitting to and receiving from the portable key information required for driving a motorcycle;
a locking mechanism for locking and unlocking at a predetermined position a handlebar provided for steering the motorcycle; and
a control section transmitting information to the transmission section, to execute, on the basis of information received from the reception section, an authentication process required for driving the motorcycle and, when the authentication process successfully ended, to cause the locking mechanism to unlock the handlebar; and
a switch part that initiates the authentication process by the control section is provided on a grip of the handlebar, wherein the switch part comprises a proximity sensor which is disposed inside the grip.

11. The motorcycle handlebar lock system of claim 10, further including a tubular grip support member rotatably mounted to the handlebar, the grip coaxially surrounding the tubular grip support.

12. The motorcycle handlebar lock system of claim 10, wherein the proximity sensor senses capacitance changes due to the presence and absence of a hand of the rider on the grip.

13. The motorcycle handlebar lock system of claim 12, the proximity sensor including a sensor board fitted into an end part of the handlebar,
a first support member coaxially disposed within the handlebar and supporting a first end of the sensor board,
a second support member laterally disposed between the grip and the end part, the second support member supporting a second end of the sensor board,
an electrode embedded in the grip, and
first and second wires connecting the electrode to the sensor board.

14. The motorcycle handlebar lock system of claim 13, wherein the sensor board is electrically connected to the control section.

15. A motorcycle handlebar lock system, comprising:
a portable key designed to be carried by a motorcycle rider;
transmission and reception sections for transmitting to and receiving from the portable key information required for driving a motorcycle;
a locking mechanism for locking and unlocking at a predetermined position a handlebar provided for steering the motorcycle; and
a control section transmitting information to the transmission section, to execute, on the basis of information received from the reception section, an authentication process required for driving the motorcycle and, when the authentication process successfully ended, to cause the locking mechanism to unlock the handlebar;
a switch part that initiates the authentication process by the control section is provided on a grip of the handlebar; and
a vehicle velocity sensor for detecting a traveling state of the motorcycle, wherein the control section is designed to keep the handlebar unlocked when the grip is gripped or when the motorcycle is detected as being in the traveling state.

16. The motorcycle handlebar lock system of claim 15, further including a tubular grip support member rotatably mounted to the handlebar, the grip coaxially surrounding the tubular grip support.

17. The motorcycle handlebar lock system of claim 15, wherein the switch part is a capacitance sensor.

18. The motorcycle handlebar lock system of claim 17, the capacitance sensor including a sensor board fitted into an end part of the handlebar,
a first support member coaxially disposed within the handlebar and supporting a first end of the sensor board,
a second support member laterally disposed between the grip and the end part, the second support member supporting a second end of the sensor board,
an electrode embedded in the grip, and
first and second wires connecting the electrode to the sensor board.

19. The motorcycle handlebar lock system of claim 18, wherein the sensor board is electrically connected to the control section.

* * * * *